United States Patent [19]
Havens et al.

[11] Patent Number: 5,691,790
[45] Date of Patent: Nov. 25, 1997

[54] COLORED LIQUID CRYSTAL DISPLAY HAVING A REFLECTOR WHICH REFLECTS DIFFERENT WAVELENGTHS OF LIGHT FOR DIFFERENT INCIDENT ANGLES

[75] Inventors: John Havens, Menlo Park; Paul S. Drzaic, Palo Alto, both of Calif.

[73] Assignee: Raychem Corporation, Menlo Park, Calif.

[21] Appl. No.: 511,161

[22] Filed: Aug. 4, 1995

[51] Int. Cl.$^6$ .................... G02F 1/1335; G02F 1/333; G02B 5/32

[52] U.S. Cl. .................... 349/113; 349/86; 349/115; 359/15

[58] Field of Search .................... 349/86, 113, 115; 359/15, 19

[56] References Cited

U.S. PATENT DOCUMENTS

| | | | |
|---|---|---|---|
| 505,898 | 10/1893 | Ma et al. | 359/94 |
| 4,032,218 | 6/1977 | Scheffer | 349/115 |
| 4,435,057 | 3/1984 | Nakai et al. | 354/426 |
| 4,535,041 | 8/1985 | Fielding et al. | 430/1 |
| 4,588,664 | 5/1986 | Fielding et al. | 430/1 |
| 4,596,445 | 6/1986 | Fergason | 350/339 F |
| 4,685,771 | 8/1987 | West et al. | 350/347 V |
| 4,856,876 | 8/1989 | Fergason | 350/350 F |
| 4,953,953 | 9/1990 | Fergason | 350/339 F |
| 4,970,129 | 11/1990 | Ingwall et al. | 430/1 |
| 4,991,940 | 2/1991 | Dalisa et al. | 350/339 |
| 4,992,201 | 2/1991 | Pearlman | 252/299.1 |
| 5,198,912 | 3/1993 | Ingwall et al. | 359/3 |
| 5,251,049 | 10/1993 | Sato et al. | 359/40 |
| 5,267,060 | 11/1993 | Colton | 359/15 |
| 5,408,344 | 4/1995 | Takiguchi et al. | 349/65 |
| 5,452,113 | 9/1995 | Ikeno | 349/77 |
| 5,508,831 | 4/1996 | Nakamura et al. | 349/74 |
| 5,594,560 | 1/1997 | Jelley et al. | 349/70 |

FOREIGN PATENT DOCUMENTS

| | | | |
|---|---|---|---|
| 0 313 053 A2 | 4/1989 | European Pat. Off. | G02F 1/133 |
| 0 478 299 A2 | 4/1992 | European Pat. Off. | |
| 0 578 302A1 | 1/1994 | European Pat. Off. | G02F 1/00 |
| 0 600 349 A1 | 6/1994 | European Pat. Off. | G02F 1/1335 |
| 0 631 157 A1 | 12/1994 | European Pat. Off. | G02B 5/30 |
| WO 90/03593 | 4/1990 | WIPO | G02F 1/133 |
| WO 95/12826 | 5/1995 | WIPO | G02B 5/32 |

OTHER PUBLICATIONS

Doane et al. Japan Display 1992, 73 (1992).
Yang et al. J. Appl. Phys 76(2), 1331–1333 (1994).
West et al., Appl. Phys. Lett. 63(11), 1471–1473 (1993).
Drzaic et al., Appl. Phys. Lett 62(12), 1332–1334 (1993).
Drziac, Mol. Cryst. Liq. Cryst. 261, 383–392 (1995).
Drzaic et al., SID 92 Digest, 571–573 (1992).
Chen et al., SID 95 Digest, 176–179 (1995).
Ingwall et al., Opt. Eng., 28(6), 586–591 (1989).
Derwent abstract No. 86–085477/13 (abstract of Matsushita, JP 61–032801 (1986).
Derwent abstract WPI Acc. No. 87–010570/02 (abstract of Matsushita, JP 61–267702 (1986).
Derwent abstract WPI Acc. No. 86–242007/37 (abstract of Matsushita, JP 61–170704 (1986).
Derwent Abstract WPT Acc. No. 94–00803/02 (abstract of EP 0,578,302 A1).
Derwent abstract WPI Acc. No. 95–031733/05 (abstract of EP 0 631,157 A1).

*Primary Examiner*—William L. Sikes
*Assistant Examiner*—Charles Miller
*Attorney, Agent, or Firm*—Herbert G. Burkard; Yuan Chao

[57] ABSTRACT

A colored reflective liquid crystal display employs a liquid crystal light valve switchable between a light scattering and a transmissive state. Positioned on the non-viewing side of the light valve is a reflector which reflects light of selected wavelengths and transmits the other wavelengths.

20 Claims, 1 Drawing Sheet

COLORED LIQUID CRYSTAL DISPLAY HAVING A REFLECTOR WHICH REFLECTS DIFFERENT WAVELENGTHS OF LIGHT FOR DIFFERENT INCIDENT ANGLES

TECHNICAL FIELD OF THE INVENTION

This invention relates to a colored reflective liquid crystal display.

BACKGROUND OF THE INVENTION

The commonly used twisted nematic (TN) liquid crystal display shows dark characters on a gray or silvery background. For some applications, a display showing bright colored characters or other items of information is desirable. This has been achieved by the inclusion of dyes or filters, but the color intensity, brightness, and/or contrast are not always satisfactory. It has been proposed to combine holographic reflectors with TN or super-twisted nematic (STN) displays to produce a backlit, colored appearance. Chen et al., SID 95 Digest, 176–179 (1995).

Colored displays can also be made using encapsulated liquid crystal materials, in which plural volumes of a liquid crystal material are dispersed or encapsulated in a matrix material. In one approach, a dichroic dye is included in the liquid crystal material. See, for example, Fergason, U.S. Pat. No. 4,435,047 (1984) and Drzaic et al., SID 92 Digest, 571–573 (1992). In another approach, a non-pleochroic dye is included in the liquid crystal material or the matrix material, and the color effect is enhanced by a scattering effect combined with total internal reflection of the scattered light. A tuned dielectric interference layer may be positioned behind the liquid crystal material. Fergason, U.S. Pat. No. 4,596,445 (1986).

SUMMARY OF THE INVENTION

This invention provides a liquid crystal display having improved color intensity, brightness, and/or contrast compared to prior art devices. Accordingly, there is provided a colored reflective liquid crystal display, comprising

- a light valve having a viewing and a non-viewing side and switchable between a substantially light scattering state and a substantially light transmissive state, at least some of the light scattering being in a forwardly direction, said light valve comprising a liquid crystal composite wherein plural volumes of liquid crystal material are dispersed in an encapsulating material; and
- a reflector disposed on the non-viewing side of said light valve, said reflector being a holographic or polymeric cholesteric reflector wherein the wavelength of light reflected by said reflector is dependent on the incidence angle of the light.

Optionally, a dark absorber may be placed behind the reflector, optically coupled thereto.

BRIEF DESCRIPTION OF THE DRAWING(S)

FIGS. 1a and 1b depict a device of this invention, in the unpowered and unpowered states, respectively.

DESCRIPTION OF THE PREFERRED EMBODIMENTS

Figure 1A:
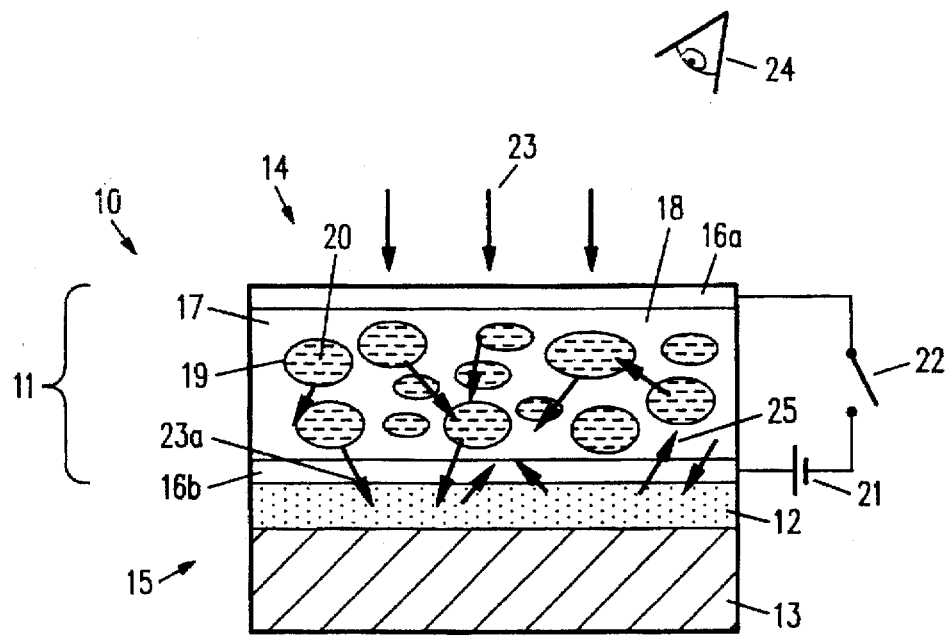
Figure 1B:
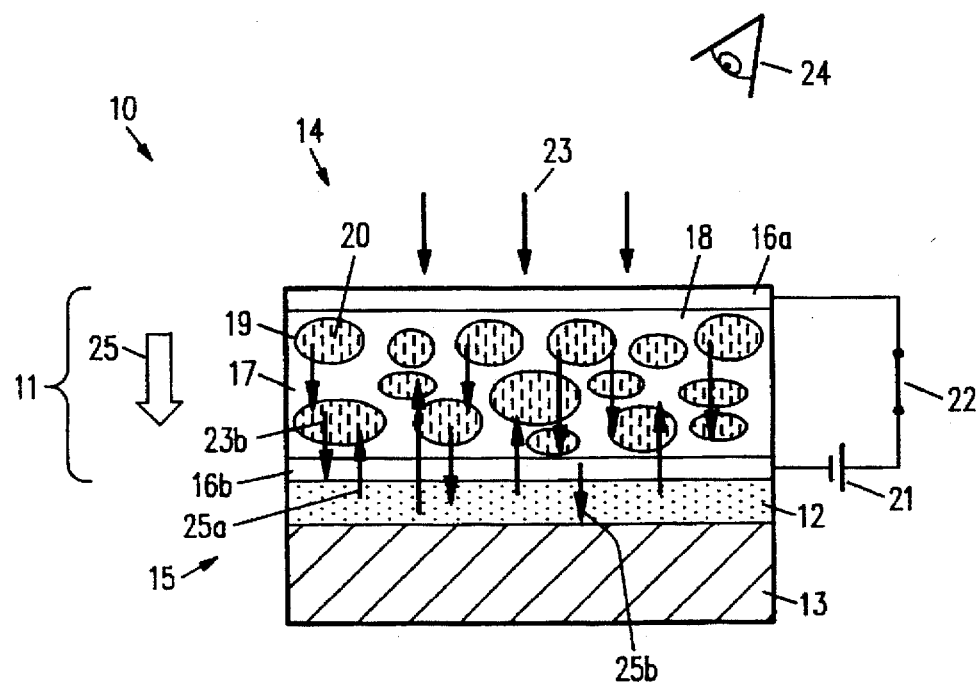

Reference is made to FIGS. 1a and 1b for explaining the operation of the instant invention. Display 10 comprises light valve 11, reflector 12, and optional dark absorber 13. Light valve 11 has a viewing side 14 and a non-viewing side 15. Light valve 11 comprises a liquid crystal composite 17 in which droplets or volumes 19 of nematic liquid crystal material 20 having a positive dielectric anisotropy are dispersed in an encapsulating material 18. Composite 17 is sandwiched between first and second electrodes 16a and 16b, respectively, made from a transparent conductor such as indium tin oxide ("ITO"). Electrodes 16 and 16b may be supported by respective supporting materials (not shown), such as polyester or glass.

The application or not of a voltage across electrodes 16a and 16b from power source 21 is controlled by switch 22, shown here in the open position ("off-state"). As a result, no voltage is impressed across composite 17 and the electric field experienced by liquid crystal material 20 is effectively zero. Due to surface interactions, the liquid crystal molecules preferentially lie with their long axes parallel to the curved interface with encapsulating material 18, resulting in a generally curvilinear alignment within each droplet. The curvilinear axes in different droplets 19 are randomly oriented. Liquid crystal material 20 has an extraordinary index of refraction $n_e$ which is different from the index of refraction $n_p$ of encapsulating material 18 and an ordinary index of refraction no which is the substantially the same as $n_p$. (Herein, two indices or refraction as said to be substantially the same, or matched, if they differ by less than 0.05, preferably less than 0.02.) (Some recent work suggests that the random alignment of the liquid crystal material between adjacent domains may contribute substantially to the scattering effect in the off-state. See Drzaic, Mol. Cryst. Liq. Cryst. 261, 383–392 (1995) and Drzaic et al., Appl. Phys. Lett. 62(12), 1332–1334 (1993). Incident light rays 23 traveling through composite 17 have a high statistical probability of encountering at least one interface between encapsulating material 18 and liquid crystal material 20 in which the liquid crystal index of refraction with which it operatively interacts is $n_e$. Since $n_e$ is different from $n_p$, there is refraction, or scattering of light rays 23, both forwardly and backwardly. As a result of multiple scattering interactions with composite 17, the substantial collimation of incident light rays 23 is destroyed, and exiting light rays 23a are incident on reflector 12 from an essentially random assortment of angles.

Reflector 12 reflects some of light rays 23a, the wavelength of the reflected light reflected being dependent on the incidence angle. That is, reflector 12 is an angularly dependent color reflector. However, because, as noted above, the incidence angle is essentially random, reflected light 25 comprises essentially all wavelengths, so that reflector 12 has the same generally white appearance of composite 17 and is hardly noticeable to a viewer 24 positioned on viewing side 14. In effect, under these conditions, reflector 12 has the appearance of a diffuse reflector. This is a significant advantage compared to using a fluorescent reflector, where the masking effect of composite 17 in the off-state would not be as efficient.

FIG. 1b shows light valve 11 in the on-state, with switch 22 closed. An electric field is applied between electrodes 16a and 16b and across composite 17, with a directionality indicated by arrow 25. (An alternating electric field may be applied, in which case the field direction changes periodically by 180°.) Liquid crystal material 20, being positively dielectrically anisotropic, aligns parallel to the electric field direction. (The required voltage is dependent inter alia on the thickness of the composite and typically is between 3 and 50 volts.) Further, this alignment with the field occurs in each droplet 19, so that there is order among the directors from droplet to droplet. When the liquid crystal molecules are aligned in this manner, the liquid crystal index of refraction with which incident light rays 23 operatively interact is $n_o$. Because $n_o$ is substantially the same as $n_p$, there is no scattering at the liquid crystal-encapsulating material interface. As a result, rays 23 are transmitted through composite 17, i.e. composite 17 becomes substantially transparent. As incident rays 23 are at least partially collimated and the collimation has not been destroyed by their passage through composite 17, exiting light rays 23b are also substantially collimated, i.e., are incident upon reflector 12 at substantially the same angle. Consequently, the bandwidth of reflected light 25a is relatively narrow—that is, reflected light 25a is intensely colored. The exact wavelength (or more accurately, waveband) of reflected light 25a will depend on the incidence angle. A very high degree of collimation is not needed for the operation of this display. Outdoor sunlight will be sufficiently collimated, as will normal indoor lighting, including ordinary ceiling and fluorescent fixtures. The color of light reflected by reflector 12 can be predetermined to a certain extent by taking into consideration the likely incidence angles of light under typical conditions in which the display is used. Incident light rays 25b having wavelengths outside of the reflection band are passed through reflector 12 to be absorbed by absorber 13. Preferably, absorber 13 is optically coupled to reflector 12, meaning that the two are in direct contact, without any intervening material (including air, as in an air gap). Absorber 13 can be made of any suitable black or dark material, for example a sheet of black paper or plastic, or a painted surface. Thus, by applying or not an electric field, display 10 can be made to appear white, black, or intensely colored, with bright, saturated colors, without the need for a backlight and relying only on ambient lighting.

Composite 17 can be made by any number of methods known in the prior art. Exemplary disclosures include Fergason, U.S. Pat. No. 4,435,047 (1984); West et al., U.S. Pat. No. 4,685,771 (1987); Pearlman, U.S. Pat. No. 4,992,201 (1991); and Dainippon Ink, EP 0,313,053 (1989); the disclosures of which are incorporated herein by reference. Composite 17 optionally may include a pleochroic dye, but a construction in which dye is essentially absent is also contemplated. Suitable encapsulating materials include polyurethane, poly(vinyl alcohol), epoxies, poly(vinyl pyrrolidone), poly(ethylene glycol), poly(acrylic acid) and its copolymers, poly(hydroxy acrylate), cellulose derivatives, silicones, acrylates, polyesters, styrene-acrylic acid-acrylate terpolymers, and mixtures thereof. Composite 17 may be made by an emulsion techniques (see, e.g., Fergason '047, supra), latex techniques (see, e.g., Pearlman '201, supra) or phase separation techniques (see, e.g., West '771, supra).

For sake of clarity, in FIGS. 1a and 1b the discussion of the invention was exemplified with a composite 17 in which the off-state is light scattering (also referred to as the "normal mode"). Those skilled in the art will appreciate that "reverse mode" composites (i.e., which are transparent in the off-state and scattering in the on-state) are known and are equally usable in the instant invention. It is not important whether it is the on-state or the off-state which is scattering—what is important is that one of the states be scattering and that the composite be switchable between that state and a transparent one. For an illustration on the preparation of a reverse mode composite, see Ma et al., U.S. Pat. No. 5,056,898 (1991), the disclosure of which is incorporated herein by reference.

Also suitable for use in this invention are composites in which the liquid crystal material is a cholesteric material (also known in the art as a chiral nematic material). The techniques used to make the cholesteric composites are substantially analogous to those employed for making nematic composites. As in the instance of the nematic composites, cholesteric composites can operate in either the normal or the reverse mode. The switching of a cholesteric based display involves the reorientation and realignment of the cholesteric domains. Exemplary disclosures of cholesteric composites include West et al., Appl. Phys. Lett. 63(11), 1471–1473 (1993); Yang et al., J. Appl. Phys. 76(2), 1331–1333 (1994); and Doane et al., Japan Display 1992, 73 (1992); the disclosures of which are incorporated herein by reference.

Generally, the reflector contains periodic refractive index variations in the material forming it. The wavelength of incident light reflected is also a function of this periodicity, given approximately by the equation:

$$\lambda = 2d \sin \theta$$

where $\lambda$ is the wavelength of reflected light, d is the periodicity of the refractive index variations in the reflector, and $\theta$ is the angle of incidence. Thus, the reflective characteristics of the reflector can be determine at the manufacturing stage, by establishing a particular periodicity in the refractive index variations therein.

A reflector suitable for use in this invention is a holographic reflector. Preferably, the holographic reflector is a volume phase hologram, also known as a refractive index modulated hologram, in which holographic fringes are formed by the photo-polymerization or -crosslinking of a photocurable material after exposure to a light interference pattern generated by two interfering laser beams. Examples of photocurable materials which can be made for making volume phase holograms include dichromated gelatin and acrylates. A preferred material is DMP-128, from Polaroid Corporation. Disclosures of suitable holographic reflectors include Fielding et al., U.S. Pat. No. 4,535,041 (1985); Fielding et al., U.S. Pat. No. 4,588,664 (1986); Ingwall et al., U.S. Pat. No. 4,970,129 (1990); and Ingwall et al., Opt. Eng., 28(6), 586–591 (1989), the disclosures of which are incorporated herein by reference. To increase the viewing cone, the incidence angle dependence of the reflector can be reduced by deliberately introducing a slight randomization of the reflection planes of the holographic reflector. In any event, for hand held devices, where the viewing angle can be readily manipulated, the breadth of the viewing cone is not a major problem.

Another reflector suitable for use in this invention is a polymeric cholesteric reflector, made for example by curing a system containing a reactive chiral monomer to produce a cholesteric liquid crystalline structure whose pitch corresponds to a wavelength of visible light, which selectively reflects light of wavelengths centered around the pitch. Those skilled in the art will understand that cholesteric structures are chiral and that the circular polarization of light reflected thereby will correspond to the handedness of the chirality. Examples of suitable cholesteric reflectors are disclosed in Consortium Electrochem. Ind., EP 0,631,157 A1 (1994); Philips, EP 0,578,302 A1 (1994); Derwent abstract no. 87-010570/02 (abstract of Matsushita, JP 61-267702 (1986)); Derwent abstract no. 86-242007/37 (abstract of Matsushita, JP 61-170704 (1986)); and Derwent abstract no. 86-085477/13 (abstract of Matsushita, JP 61-032801 (1986)); the disclosures of which are incorporated by reference.

Those skilled in the art will appreciate that the present invention is not restricted to displays capable of only a single color or a limited set of images. By combining plural pixels, alternately having a red, a green, and a blue reflector, an RGB full-color display can be prepared, capable of displaying an indefinite variety of images, ranging from text to graphics. The alternating pattern of red, green, and blue reflectors can be made by individually positioning discrete reflectors. However, for making high resolution displays where many pixels are needed, a more efficient way may be to sequentially expose a photopolymerizable material such as DMP-128 from Polaroid Corp. with successively different wavelengths of laser light or by varying the relative angle of the interfering laser beams. A photomask can be used at each exposure to expose the desired pixel areas to the laser light while shielding the areas which should not be exposed. At the next exposure, the photomask can be shifted over by one pixel, to permit exposure of the adjoining pixels to a different wavelength of light and the production of a different colored holographic reflector. Alternatively, the photomask can be dispensed with, by using highly focused laser beams to write at each pixel location.

For driving such a display, a semiconductor active matrix is preferred, for example a thin-film transistor array. For some applications, it is aesthetically desirable to have a display with a dark front. This effect can be accomplished by including a pleochroic dye in a normal mode nematic liquid crystal composite. In the off-state, the pleochroic dye substantially absorbs incident light, creating a dark or colored appearance. (To produce the color white, red, green, and blue pixels can be turned on simultaneously.)

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A colored reflective liquid crystal display, comprising
    a light valve which substantially scatters light in a scattering state and is substantially transparent in a non-scattering state, comprising a liquid crystal composite wherein plural volumes of liquid crystal material are dispersed in an encapsulating medium;
    said light valve having a viewing and a non-viewing side, wherein some of the light scattered in the scattering state is forwardly scattered; and
    a reflector disposed on said non-viewing side of said light valve which reflects white light toward said viewing side when said light valve is in the scattering state, and reflects colored light toward said viewing side when said light valve is in the non-scattering state, wherein the wavelength of the light reflected by said reflector is dependent on the incidence angle of the light.

2. A display according to claim 1, wherein said liquid crystal material is nematic.

3. A display according to claim 2, wherein said nematic liquid crystal material includes a pleochroic dye.

4. A display according to claim 1, wherein said liquid crystal material is cholesteric.

5. A display according to claim 4, wherein said liquid crystal material is cholesteric.

6. A display according to claim 1, wherein said display further includes a dark absorber optically coupled to said reflector on the side of said reflector away from said light valve.

7. A display according to claim 6, wherein said liquid crystal material is nematic.

8. A display according to claim 1, wherein said reflector is a holographic reflector.

9. A display according to claim 8, wherein said display further includes a dark light absorber optically coupled to said reflector on the side of said reflector away from said light valve.

10. A display according to claim 8, wherein said liquid crystal material is nematic.

11. A display according to claim 8, wherein said liquid crystal material is cholesteric.

12. A display according to claim 1, wherein plural red, green and blue pixels are formed by using red, green and blue reflectors.

13. A display according to claim 12, wherein said reflectors are holographic reflectors.

14. A display according to claim 12, wherein said reflectors are polymeric cholesteric reflectors.

15. A display according to claim 12, wherein the liquid crystal material is nematic.

16. A display according to claim 12, wherein the liquid crystal material is cholesteric.

17. A display according to claim 1, wherein said reflector is a polymeric cholesteric reflector.

18. A display according to claim 17, wherein said display further includes a dark light absorber optically coupled to said reflector on the side of said reflector away from said light valve.

19. A display according to claim 17, wherein the liquid crystal material is nematic.

20. A display according to claim 17, wherein the liquid crystal material is cholesteric.

* * * * *